US009135526B2

(12) United States Patent
Dellepiane et al.

(10) Patent No.: US 9,135,526 B2
(45) Date of Patent: Sep. 15, 2015

(54) METHOD FOR EXTRACTING INFORMATION OF INTEREST FROM MULTI-DIMENSIONAL, MULTI-PARAMETRIC AND/OR MULTI-TEMPORAL DATASETS (75) Inventors: Silvana Dellepiane, Genoa (IT); Irene Minetti, Molare (IT); Gianni Vernazza, Genoa (IT)

(73) Assignee: UNIVERSITÁ DEGLI STUDI DI GENOVA, Genova (IT)

( * ) Notice: Subject to any disclaimer, the term of this patent is extended or adjusted under 35 U.S.C. 154(b) by 61 days.

(21) Appl. No.: 14/001,855

(22) PCT Filed: Mar. 8, 2012

(86) PCT No.: PCT/IB2012/051085
§ 371 (c)(1),
(2), (4) Date: Sep. 13, 2013

(87) PCT Pub. No.: WO2010/120467
PCT Pub. Date: Sep. 13, 2012

(65) Prior Publication Data
US 2013/0343637 A1 Dec. 26, 2013

(30) Foreign Application Priority Data
Mar. 9, 2011 (IT) .............................. GE2011A0026

(51) Int. Cl.
*G06K 9/00* (2006.01)
*G06K 9/62* (2006.01)
*G06N 99/00* (2010.01)

(52) U.S. Cl.
CPC ............ *G06K 9/6256* (2013.01); *G06N 99/005* (2013.01)

(58) Field of Classification Search
None
See application file for complete search history.

(56) References Cited

PUBLICATIONS

H. Zhang, H. Peng, M. D. Fairchild, E. D. Montag, Hyperspectral image visualization based on a human visual model, Proceedings of the SPIE, vol. 6806, 68060N (Jan. 28, 2008), DOI: 10.1117/12.766703, section 3; figure 2.
N. P. Jacobson, M. R. Gupta, J. B. Cole, Linear fusion of image sets for display, IEEE Transactions on Geoscience and Remore Sensing, vol. 45, No. 10 (Oct. 2007), pp. 3277-3288, DOI: 10.1109/TGRS.2007.903598, sections 1 & 2.

*Primary Examiner* — Atiba O Fitzpatrick
(74) *Attorney, Agent, or Firm* — Themis Law (57) ABSTRACT Method of extraction of information of interest to multi-dimensional, multi-parametric and/or multi-temporal datasets related to a same object under observation through data fusion, in which a plurality of different data sets are provided concerning a single object, with the data related to various parameters and/or different time acquisition instants of said parameters. The data set are subjected to a first processing step by principal component analysis generated by an identical number of datasets with transformed data; and each of the datasets is combined in non-linearly with the corresponding transformed data set to obtain a certain predetermined number of combinations of parameters by weighing using parameters determined empirically using training datasets which determine the values of the non-linear weighting parameters that maximize the value of the new features associated with the data of interest, as compared to those of other data.

10 Claims, 9 Drawing Sheets

METHOD FOR EXTRACTING INFORMATION OF INTEREST FROM MULTI-DIMENSIONAL, MULTI-PARAMETRIC AND/OR MULTI-TEMPORAL DATASETS

FIELD OF THE INVENTION

Subject of the present invention is a method for the extraction of information of interest from multi-dimensional, multi-parametric and/or multi temporal datasets concerning a single object being observed by data fusion.

BACKGROUND OF THE INVENTION

In the general artificial intelligence field, systems operating on the basis of said artificial intelligence must be enabled to acquire information from the surrounding world and use this information in order to enhance information and meta-data that are not immediately visible or to highlight features or structures or events that are not readily visible.

An usual common practice is to operate through a fusion of data from different multi-parametric datasets, that is, from a certain number of datasets that include data related, at least partially, to different parameters, or from the dataset that alternatively or in combination with the fact of having data for at least a part of different parameters presents data collected in different time instants.

The data fusion technique is widely known and described for example in the document Dasarthy, Decision Fusion, IEEE Computer Society Press, 1994.

The fusion is advantageous for different purposes such as detection, recognition, identification, tracking, decision making. These goals are pursued in a large number of different application fields such as robotics, medicine, geological monitoring and many other fields.

A major fusion aim is the improvement of the reliability related to decision making processes executed by automated or robotic machines or operating with artificial intelligence.

For example, thanks to additional or complementary information through the acquisition of images in different modalities, with different sensors, and the fusion of these images, the information about the object depicted in the image can be improved by the fusion of image data for these objects, and then the reliability of the decision choice is improved dependent on the image information content, both at the level of human decision or performed by an artificial-based machine intelligence.

The data fusion systems combine multiple sources of original data to each other to make new sets of data, in which information is organized differently and whose content can better be extracted from the data.

Actually, the known data-fusion systems are not satisfactory with respect to the objective of fusing elements of information one with each other in a way targeted to the detection of the data structures of interest.

Systems are known for processing data that operate on the data so as to operate at the level of features (characteristics) represented by the data itself. The information space of a set of data may be subjected to a transformation which generates a new basis of orthogonal vectors that describe the so-called features where it is possible to represent the data of said set. A known method that operates this transformation is the so-called Principal Component Analysis (PCA).

A more detailed and rigorous description of this technique is reported in the document Principal Component Analysis IT Jolliffe, Second edition, Springer series in statistics, ISBNO-387-95442-2, 2002. This description is considered part of the present description.

This transform describes the data as a combination of several "features", generating a vector of "features" that essentially identifies the information represented by the data organizing it from the most relevant information to the less important ones.

SUMMARY OF THE INVENTION

The invention has the purpose to generate a method for the extraction of information of interest from multi-dimensional, multi-parametric and/or multi temporal datasets that can operate in a fast way and allows putting in evidence in a reliable and safe way and without excessive computational load.

The invention achieves the above purposes by providing a method for extracting information of interest from multi-dimensional, multi-parametric and/or multi-temporal datasets concerning a single object being observed by data fusion, wherein a plurality of different data sets are provided for the same object, with data related to different parameters and/or different times of acquisition of said parameters;

said data sets undergo a first processing step, by Principal Component Analysis (PCA), yielding an identical number of data sets with transformed data, represented by a combination of "features";

each of said data sets is non-linearly combined with the corresponding transformed data set, thereby providing a certain predetermined number of combination data sets, using weighting parameters; which weighting parameters are established in an empirical and experimental manner, using training data sets, which training data sets are used to determine the non-linear weighting parameter values, which maximize the values of the new features associated with the data of interest, as compared with those of the other data.

The method described above combines together the data from different data sets in such a way that data related to the characteristics of interest previously defined are grouped into individual clusters, and non-linear combination function has been optimized for feature enhancement and to maximize the distance of said groups of data between them, too.

According to an improvement, wherein the data sets are merged to generate three combination data sets, each of said combination data sets being associated with a different color of the three RGB colors to represent data into an image, said three images being in overlapped relation and hence displaying the data of interest in white color, resulting from the combination of the three RGB colors.

A particular application is that concerning the processing of digital images in any application field.

Therefore, the invention consists in a method for the extraction of information of interest from multi-dimensional, multi-parametric and/or multi-temporal datasets that operates data fusion of multi-parametric, multi-sensory and/or multi-temporal data—also of the volumetric type—at a numerical level, in which the original data is transformed according to the specific process described which takes into account the intrinsic characteristics of the data.

Then the transformed data are appropriately combined with the original data on the basis of the application and the objective to be achieved, or on the basis of the structures of interest one wants to highlight.

The method provides a new three-dimensional volume data. For the calibration of the combination parameters a training dataset is used.

Finally, as a further additional step, colorimetric information, which allows the display, is associated to the new data obtained according to the steps of processing and combination: each component of the new volume is associated with a color channel in a predetermined color space (for instance, RGB). In the case the original volumes of data are in number less than or equal to three it follows that no loss of information content takes place in the application of the method, but only a different distribution, with a consequent enhancement of certain content with respect to others.

This method is general and is adaptive to all areas where one has to deal with multi-parametric and multi-dimensional data.

Especially, the method is particularly suitable in the biomedical imaging field or in the analysis of changes from remote sensing data.

Further refinements and features of the present invention are subject of the claims.

BRIEF DESCRIPTION OF THE DRAWINGS

The characteristics of the invention and the advantages thereof will become clearer from the following description of some embodiments illustrated in the accompanying drawings in which:

FIGS. 2a, 2b, 2c show the images related to the image data of the previous FIGS. 1a, 1b, 1c transformed with PCA: 100th slice volume and in which

DETAILED DESCRIPTION OF EMBODIMENTS OF THE INVENTION

As already indicated above, the purpose of the method according to the present invention is the fusion of data aiming at the enhancement of the structures of interest. Such enhancement is obtained both in terms of a better clustering of data in the space of chosen features, both in enrichment in terms of a color display.

Particularly, the aim is to maximize the value of the new features associated with the data of interest, as compared to those of the other clusters. In this way, when each feature is associated with a corresponding color channel, the structures of interest are displayed in white, in contrast with the surrounding regions (colored or darker).

Moreover, when necessary, from colored volume thus obtained is possible to obtain as a result an additional three-dimensional rendering of monoparametric structures of interest with masking of the surrounding structures.

The steps of the method according to the present invention are indicated in more detail below:

A number n of original data volumes ($V_1, \ldots, V_n$), related to a single object being observed and acquired in different manners or at different times, and which data volumes are co-registered, are given.

1. Such data are standardized by 0-1 scaling with the formula:

$$V_{n_i} = \frac{V_i - \min(V_i)}{\max(V_i) - \min(V_i)}$$

2. Principal Component Analysis (PCA) is performed to increase decorrelation between data volumes, thereby obtaining n volumes of transformed data ($PC_1, \ldots, PC_n$)

3. The new three-dimensional output feature vector, O, is calculated with the following formula:

$$O_i = \sum_{j=1}^{n} \alpha_{i,j} V_{n_j}^{\beta_{i,j}} + \sum_{j=1}^{n} \gamma_{i,j} PC_j^{k_{i,j}}$$

where $i = 1, \ldots, 3$ $j = 1, \ldots, n$ $-1 \leq \alpha_{i,j} \leq 1$ $0.5 \leq \beta_{i,j} \leq 4$ where $\alpha_{i,j}$, $\beta_{i,j}$, $\gamma_{i,j}$, $k_{i,j}$ are defined during the training step and are designed to maximize the $O_i$ value for the data of interest.

4. The three volumes are merged into a single colored volume.

Figure 4A:
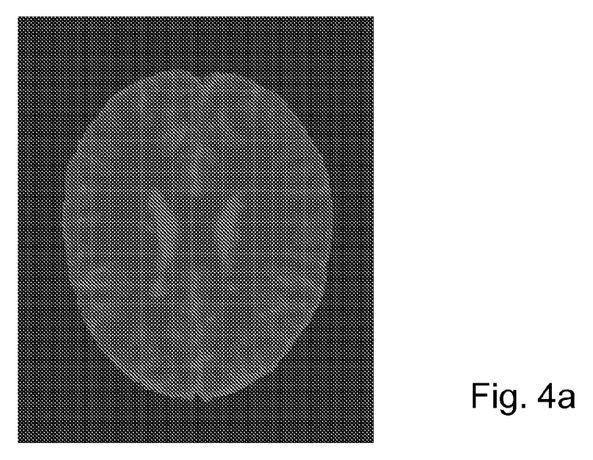
FIG. 4 shows the image of the color display of output images O.
Figure 4B:
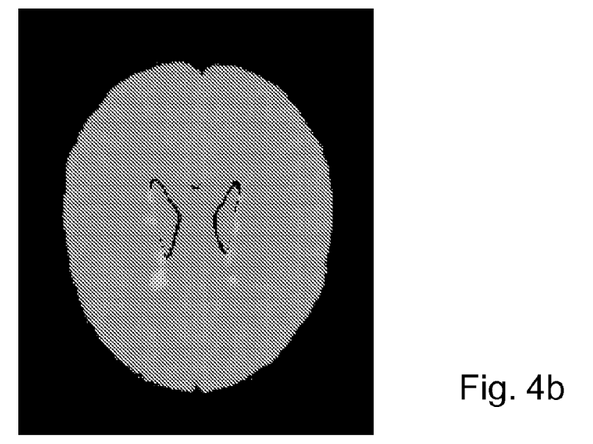
Figure 4C:
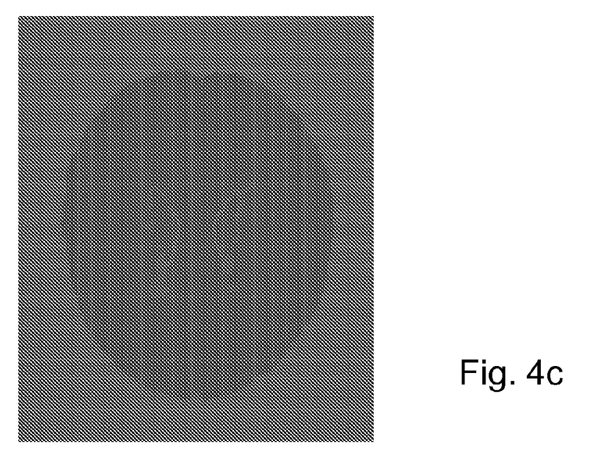

This result is obtained by placing each of the three volumes obtained in the previous step on a different color channel (for example see FIG. 4), thereby obtaining a red-scale volume, a green-scale volume and a blue-scale volume, and composing them together into a single colored volume, in which the region of interest has a whitish color.

Despite the general description of the method, it is applicable to any kind of data, since any set of data can be always represented in a space in a graphical mono-, bi-, tri- or n-dimensional shape, it is easier to describe specific applications of the method which refer to two-dimensional images or sections of three-dimensional images.

As already indicated in the general steps, the images represent original data sources and are mutually co-registered. This step can be performed with any known type of geometrical registration method. These methods belong to the state of the art and to the technical background knowledge of the expert and are not part of the present invention and, therefore, they are not described in detail.

EXAMPLE 1

Enhancement of multiple sclerosis plagues from spatial sequences of multi-parametric acquisitions of the brain, according to the three different MRI modalities, i.e., $T_1$-weighted, $T_2$-weighted, proton-density (PD). Images related to those acquisitions are reproduced in FIGS. 1a, 1b, 1c.

Figure 2A:
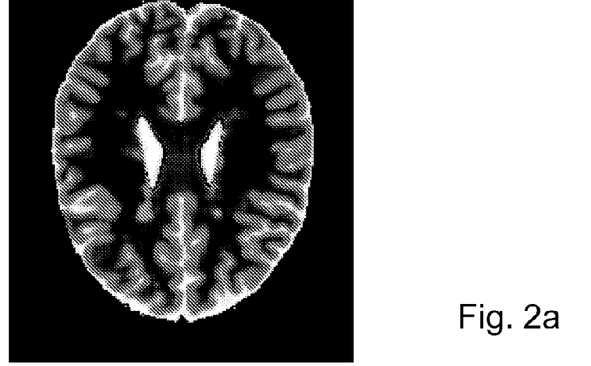
FIG. 2a shows the original data projected along the axis of the first principal component.
Figure 2B:
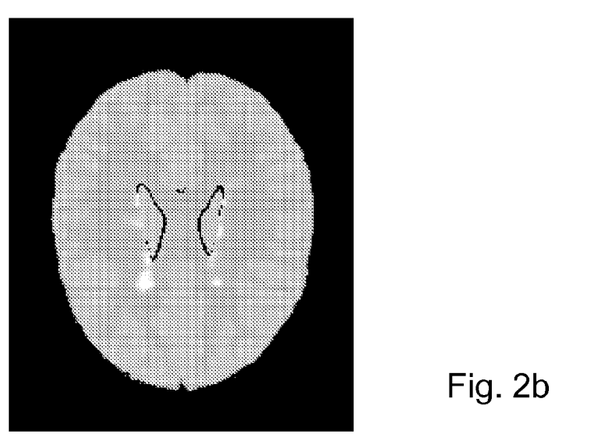
FIG. 2b shows the original data projected along the axis of the second principal component.
Figure 2C:
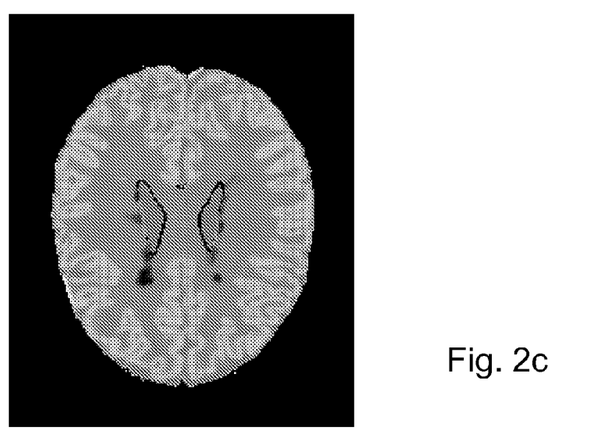
FIG. 2c illustrates the original data projected along the axis of the third principal component.

After normalizing image data concerning the three different MRI modalities $T_1$-weighted, $T_2$-weighted, Proton-Density according to the first step of the method of the present invention, the second step is executed which implies the projection of the data along the principal components obtained by the PCA transformation. The result of this step is illustrated in the images of FIGS. 2a, 2b, 2c.

At the end of the second step the following data are available:

$$V = \begin{bmatrix} T1 \\ T2 \\ PD \end{bmatrix} \text{ original data;}$$

$$PC = \begin{bmatrix} PC1 \\ PC2 \\ PC3 \end{bmatrix} \text{ transformed data}$$

Figure 1A:
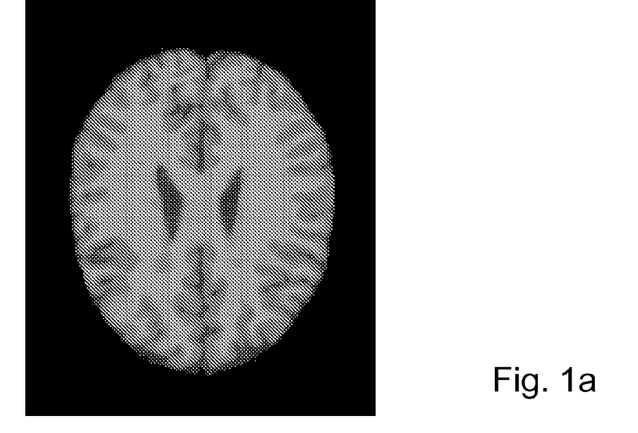
FIGS. 1a, 1b, 1c show the original data consisting of the MRI images of a brain suffering from multiple sclerosis, 100th slice of volume and represent respectively: (a) $T_1$-weighted image, (b) $T_2$-weighted image, (c) Proton-density image.
Figure 1B:
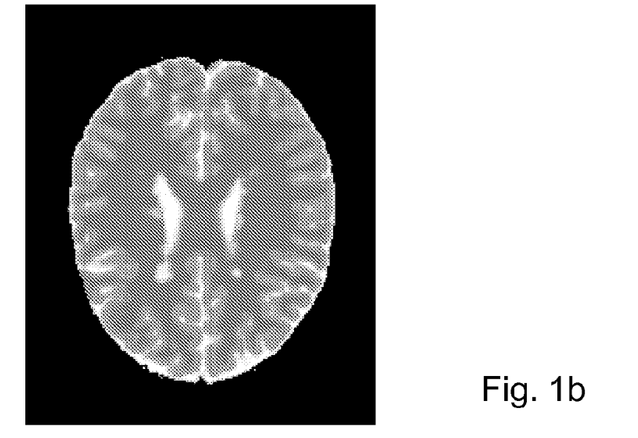
Figure 1C:
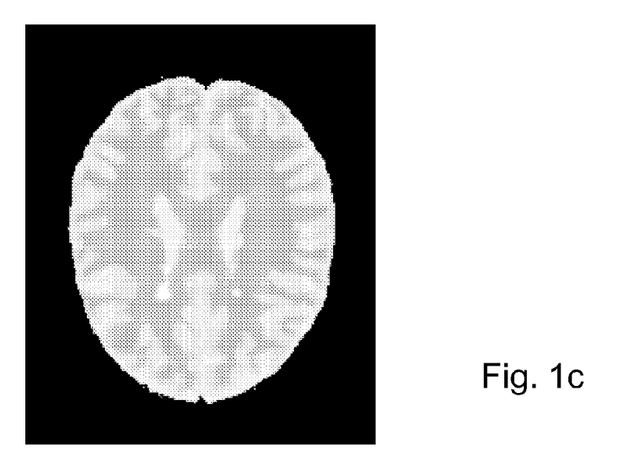
Figure 3:
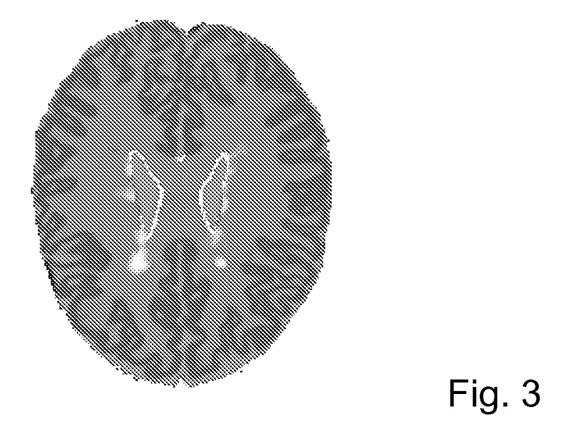
FIG. 3 shows the image of FIG. 2c (projection along the third component) reversed.

One can notice that the sclerosis plaques are more readily apparent and lighter in the image of FIG. 1a ($T_2$-weighted) and FIG. 2b (projection along the second principal component, $PC_2$). Also in FIG. 2c ($PC_3$) the plaques are enhanced with respect to the surrounding tissues. However, in the latter case, the plagues are very dark. By reversing the image, (i.e., by creating the negative) one gets a very good contrast, in which the plaques are light (FIG. 3).

After performing a step of empirical experimental determination of the optimal parameters of the non-linear weighted combination, the values of these parameters are obtained.

The experimental determination can be done either by placing as input the original image data and transformed data and in output the result image produced according to the desired level of enhancement, or by performing a series of variations of these parameters and by verifying the output result in the form of an image, by choosing as parameters to be used for the application of the method those which gave rise to the best results.

In this case the parameter arrays proposals are therefore:

$$\alpha = \begin{bmatrix} 0 & 1 & 0 \\ 0 & 0 & 0 \\ 0 & 0 & 0 \end{bmatrix} \beta = \begin{bmatrix} 1 & 1 & 1 \\ 1 & 1 & 1 \\ 1 & 1 & 1 \end{bmatrix} \gamma = \begin{bmatrix} 0 & 0 & 0 \\ 0 & 1 & 0 \\ 0 & 0 & -1 \end{bmatrix} k = \begin{bmatrix} 1 & 1 & 1 \\ 1 & 1 & 1 \\ 1 & 1 & 1 \end{bmatrix}$$

Figure 5A:
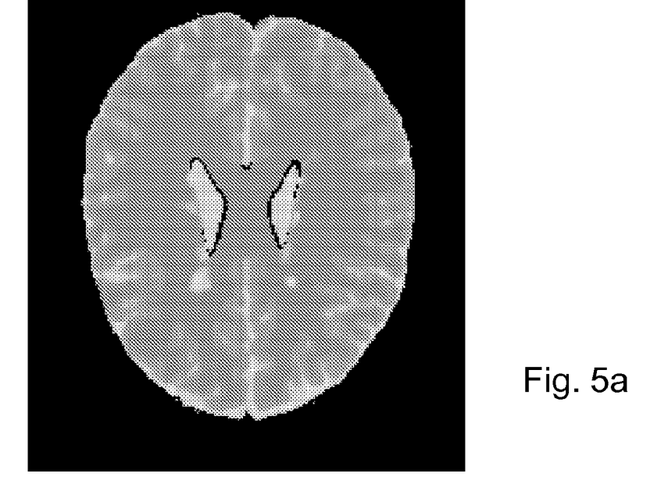
FIGS. 5a and 5b show respectively the RGB composition of the original data and the RGB composition of the transformed data.
Figure 5B:
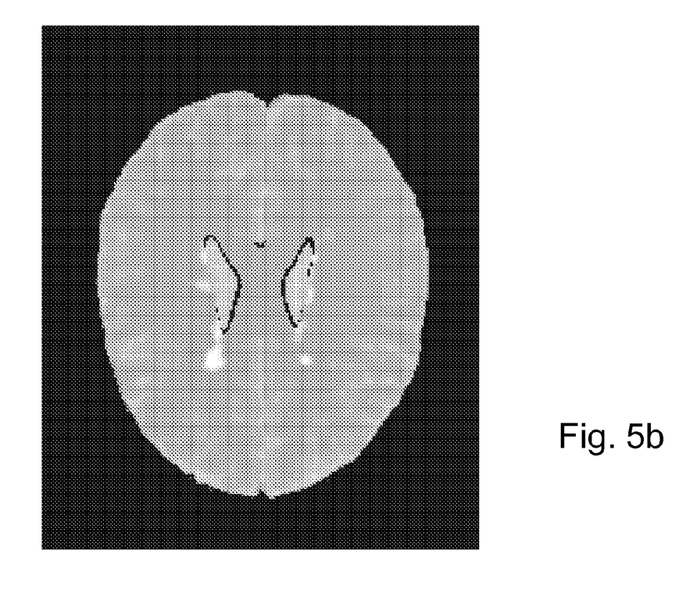

Making the composition of the RGB output volumes thus obtained, by placing the slice of each volume output $O_i$ on the three channels (FIG. 4), one obtains the composition presented in FIG. 5b, in which the plagues are almost white and very contrasted with respect to the surrounding tissue, in contrast to the mere RGB composition of the original data presented in FIG. 5a.

Figure 6A:
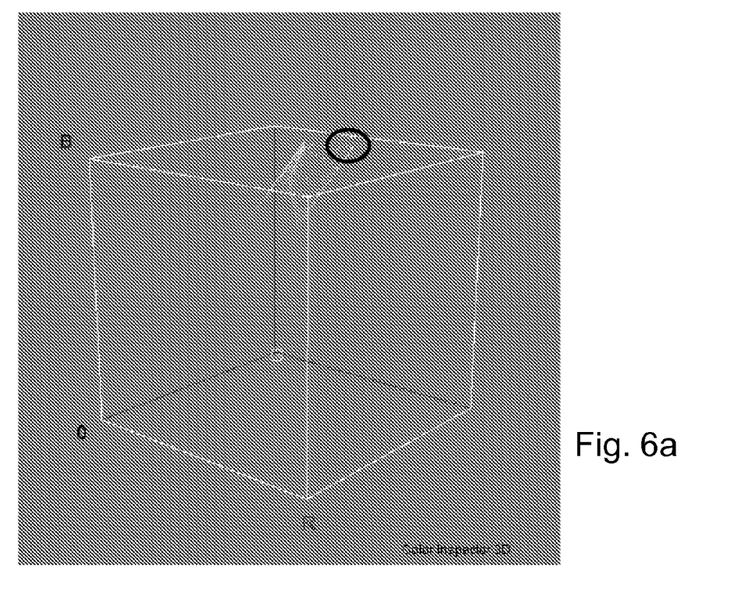
FIGS. 6a and 6b show respectively the distribution of data within the feature space of the original data and that of the transformed data, in which the circle shows the position of the structures of interest.
Figure 6B:
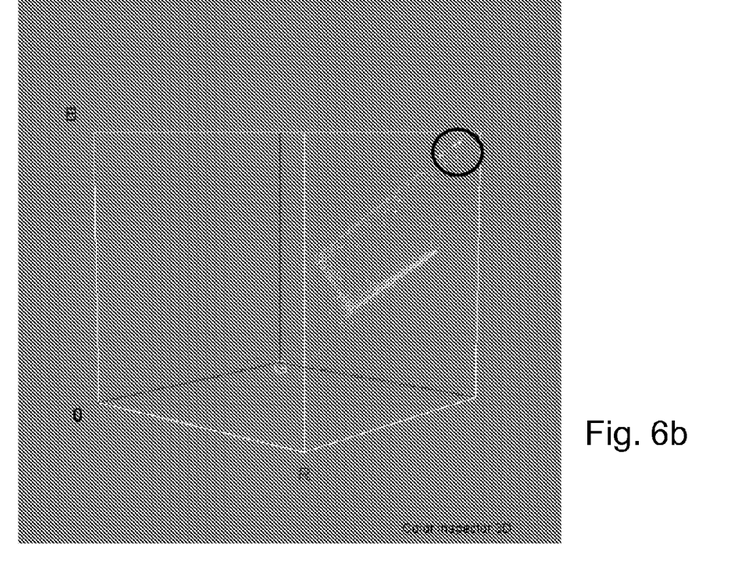

By observing the clustering of the data in the original three dimensional space and by comparing it with the one in the transformed space (FIG. 6), one can see how the structures of interest (indicated by the circle) are better separated from the other clusters, and therefore better visually enhanced in the transformed volume.

Moreover, as a further result, a "stretching" of the data is obtained that is now better distributed along the axes of the new transformed three-dimensional space. Visually, this results in a stretching of the histogram of the image resulting in increased contrast enhancement and better visualization of the structures of interest.

EXAMPLE 2

Figure 7:
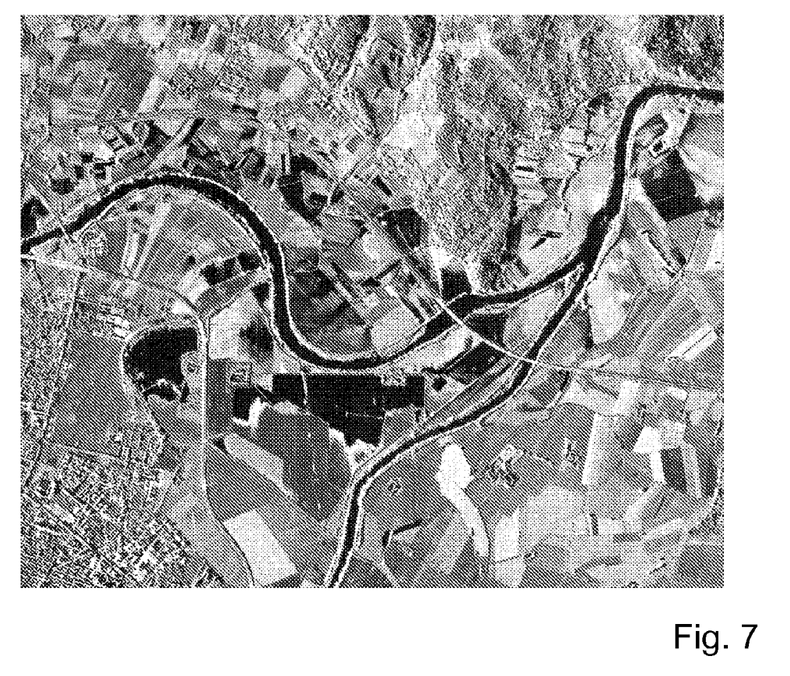
FIG. 7 shows an image of the flooded area prior to the occurrence of the event.
Figure 8:
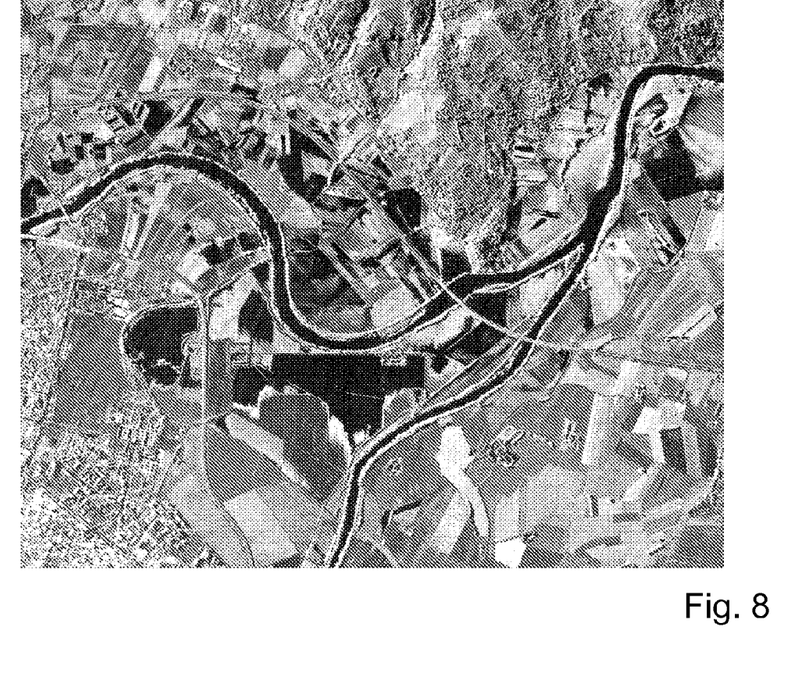
FIG. 8 is a view similar to that of FIG. 7, but related to a post-event timing.

Enhancement of the flooded areas obtained from the data source consisting of a pair of co-registered SAR (Synthetic Aperture Radar) images which are reproduced in FIGS. 7 and 8.

The source data are made of the dataset $V_1$, whose image is shown in FIG. 7 and corresponds to a SAR acquisition of a land portion before a flood event, and of the dataset $V_2$, whose image is shown in FIG. 8, corresponding to a SAR acquisition of the same piece of land after the flood event. In this case, therefore, n=2.

The data source is then defined as $$V = \begin{bmatrix} \text{Pre} \\ \text{Post} \end{bmatrix}$$

Figure 9:
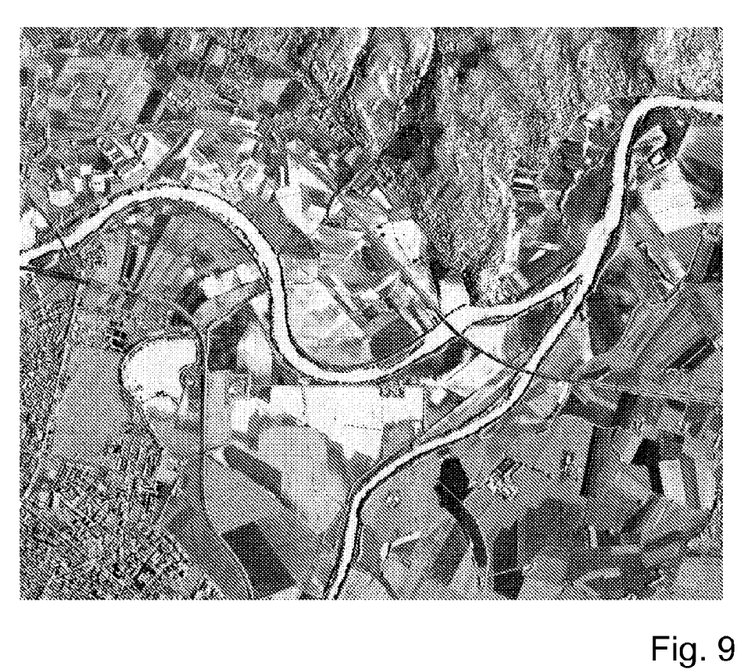
FIG. 9 is a view of the first principal component.
Figure 10:
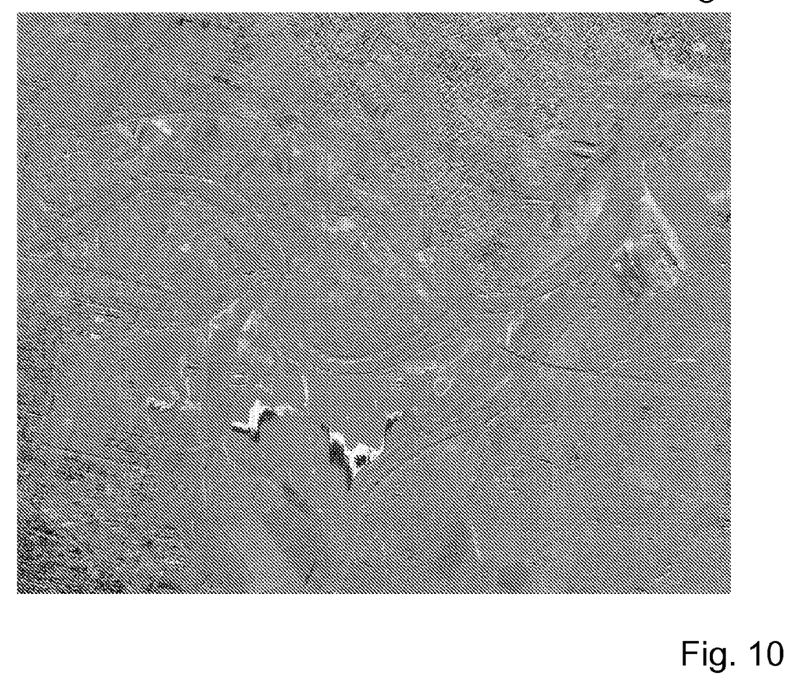
FIG. 10 is an image of the second main component.

The result O of the principal components analysis is shown in FIG. 9 and FIG. 10. The flooded area is the one that appears very clear in the second main component (FIG. 10).

In this case, always by means of empirical determination as described above for Example 1, optimal values of the fusion parameters are fixed and they appear to be:

$$\alpha = \begin{bmatrix} 0 & 0 \\ 0 & -1 \\ 1 & 0 \end{bmatrix} \beta = \begin{bmatrix} 1 & 1 \\ 1 & 1 \\ 1 & 1 \end{bmatrix} \gamma = \begin{bmatrix} 0 & 1 \\ 0 & 0 \\ 0 & 0 \end{bmatrix} k = \begin{bmatrix} 1 & 1 \\ 1 & 1 \\ 1 & 1 \end{bmatrix}$$

Figure 11:
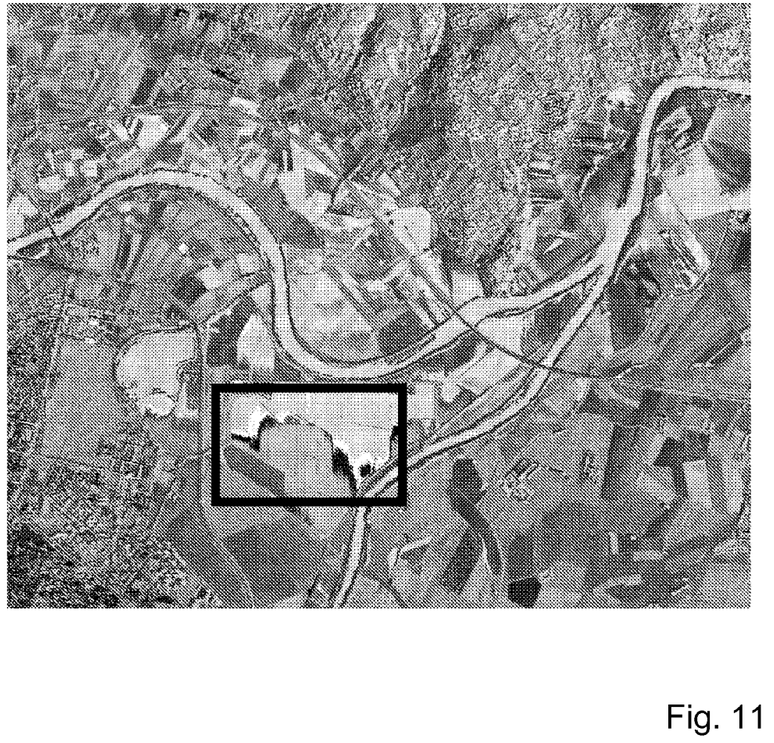
FIG. 11 depicts the image on the RGB composition of the transformed data with enhancement of the flooded areas.

The result obtained is shown in FIG. 11, where the permanent water appears in gray and the flooded areas in white, which represent in this case the structure of interest to be highlighted. Since the representation of graphic material attached to this patent application is forced to shades of gray, the zone concerning the flooded area was highlighted with a rectangular frame. In the color image the flooded area is white, while the remaining areas are coloured in green or purple in this case, so the white area stands out in a clear and evident way with respect to the other colored areas. A loss occurs in terms of evidence of the result also with reference to FIG. 5b of previous Example 1, in which in the scale of gray image one is unable to appreciate how the area concerning the plaques is put into evidence, thanks to the difference of color with respect to white area (colored area and plaque).

From the foregoing it is evident that the method here proposed for the extraction of information of interest from multi-parametric and/or multi-temporal datasets by means of the fusion of said data results to be a support in the visual analysis of large amounts of data, thanks to the integrated view of information and enhancement of structures of interest with respect to adjacent regions.

Advantages of the application of this procedure are the reduction of time for visual analysis of the data, the focus of attention on areas of interest (for example, signs of pathology in biomedical images or, more generally, of change) with consequent reduction of missed-alarm errors.

Furthermore, the method applied to large volumes of multidimensional data allows to merge with each other multiparametric data or multi-temporal data in a targeted highlighting of features or qualities described by the data itself, facilitating a better separation of clusters of data related to features that are generated in the transformation PCA, which best clustering maximizes the distance between the clusters making them more visible or identifiable clusters of data having the characteristics of interest. This operation is performed with low expenditure of calculation and with considerable reliability, so that the method according to the present invention can also operate as a method of data mining or classification.

EXAMPLE 3

The invention is applicable to any hardware/software system of the type comprising computerized means of artificial intelligence. When this system is designed to run a decision control program for the execution of predetermined functions based on the outcome of an analysis of data, then the analysis of such data can be performed on the data output of a method of treatment according to the present invention.

In this case, in particular when the system detects the data using different sensors operating according to different methods or for the detection of a number of different parameters, or said data being recorded in different time instants, the system may be provided with a program for the extraction of information of interest from multidimensional, multi-parametric and/or multi temporal dataset related to concerning a single object being observed by data fusion which operates according to the method of the present invention.

In this case the analysis of the data to determine the execution of said certain function is advantageously performed on output data of said program which have been subjected to the treatment of this method and therefore present a clear highlight of the relevant characteristics to the end of the decision. This makes the operation of the system safer and more efficient and it reduces the costs of failure conditions.

The invention claimed is:

1. A method for extracting information of interest from multi-dimensional, multi-parametric or multi-temporal datasets concerning a single object being observed by data fusion, the method comprising:
    providing a plurality of different data sets for a same object, having data related to one or more of different parameters or different times of acquisition of said parameters;
    subjecting said data sets to a first processing step by Principal Component Analysis (PCA), which yields an identical number of data sets with transformed data represented by a combination of features; and
    combining each of said data sets non-linearly with a corresponding transformed data set, thereby providing a certain predetermined number of combination data sets, using weighting parameters;
    wherein the weighting parameters are established in an empirical and experimental manner using training data sets, and
    wherein the training data sets are used to determine the non-linear weighting parameter values, which maximize values of new features associated with data of interest, as compared with values of other data.

2. The method as claimed in claim 1, wherein the data sets are merged to generate three combination data sets, each of said combination data sets being associated with a different color of the three RGB colors to represent data into an image, thereby producing three images, said three images being in overlapped relation and hence displaying the data of interest in white color, resulting from a combination of the three RGB colors.

3. The method as claimed in claim 2, wherein there is a given number n of original data volumes ($V_1, \ldots, V_n$), related to a single object being observed and acquired in different manners or at different times, said original data volumes being co-registered, further comprising the steps of:
    (a) standardizing the data by 0-1 scaling with the formula:

$$V_{n_i} = \frac{V_i - \min(V_i)}{\max(V_i) - \min(V_i)};$$

(b) performing the PCA to increase decorrelation between the original data volumes, thereby obtaining n volumes of transformed data ($PC_1, \ldots, PC_n$);
(c) calculating a new three-dimensional output feature vector, O, with the following formula:

$$O_i = \sum_{j=1}^{n} \alpha_{i,j} V_{n_j}^{\beta_{i,j}} + \sum_{j=1}^{n} \gamma_{i,j} PC_j^{k_{i,j}}$$

where
$$i = 1, \ldots, 3$$
$$j = 1, \ldots, n$$
$$-1 \leq \alpha_{i,j} \leq 1$$
$$0.5 \leq \beta_{i,j} \leq 4$$

where $\alpha_{i,j}, \beta_{i,j}, \gamma_{i,j}, k_{i,j}$ are defined during a training step and are designed to maximize an $O_i$ value for the data of interest, thereby obtaining three data volumes; and (d) merging the three volumes into a single colored volume by placing the three volumes on a different color channel.

4. The method as claimed in claim 3, wherein step (d) comprises assigning a different color of the RGB colors to each of the three volumes, thereby obtaining a red-scale volume, a green-scale volume, and a blue-scale volume, and composing the three volumes together into a single colored volume, in which a region of interest has a whitish color.

5. The method as claimed in claim 1, wherein the data sets are data sets of digital images.

6. The method as claimed in claim 5, wherein the digital images are diagnostic images acquired in different manners, by different apparatus, or at different times, to highlight features of certain tissues or particular areas of anatomic regions.

7. The method as claimed in claim 5, further comprising the step of highlighting geological or geophysical features of areas that have been imaged in different manners, by different devices, or at different times.

8. The method as claimed in claim 5, further comprising the step of data mining.

9. The method as claimed in claim 5, further comprising the step of data clustering or classification.

10. The method as claimed in claim 5, further comprising the step of highlighting structures, clusters, or features of interest of multi-dimensional data in a 3-dimensional image.

* * * * *